Patented Aug. 11, 1953

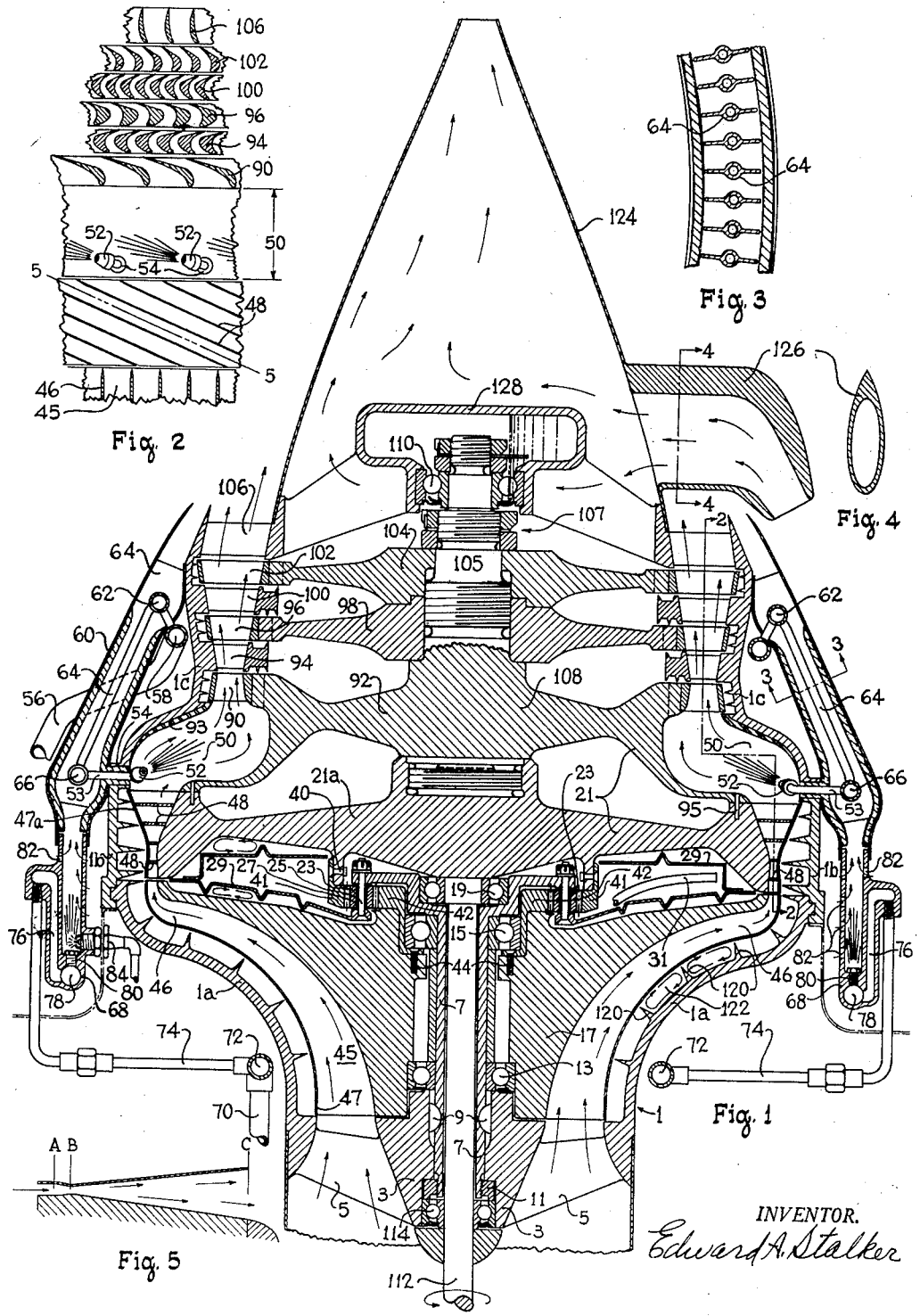

2,648,492

UNITED STATES PATENT OFFICE 2,648,492

GAS TURBINE INCORPORATING COMPRESSOR

Edward A. Stalker, Bay City, Mich.

Application May 14, 1945, Serial No. 593,631

11 Claims. (Cl. 230—119)

This invention relates to compressors and turbines and particularly to the type known as the gas turbine.

It is an object of this invention to provide an efficient gas turbine of small power.

It is also an object to provide a compact and efficient compressor of light weight, small dimensions and low cost.

Another object is to provide a unique type of combustion chamber.

Another object is to provide an efficient means of reducing windage losses.

Still another object is to provide an efficient means of burning fuel.

Other objects will appear from the following description, the accompanying drawings, and the appended claims.

I accomplish the above objects by the means illustrated in the accompanying drawings in which:

Figure 1 is a sectional view of the turbine compressor unit taken normal to a vertical plane through the rotor axis;

Figure 2 is a fragmentary view of the turbine and compressor vanes and blades taken normal to a circumferential broken plane represented by line 2—2 of Figure 1;

Figure 3 is a sectional view of a portion of the annular turbine fuel preheater taken along line 3—3 of Figure 1;

Figure 4 is a cross section of the streamlined duct through which cooling air is directed onto the rear bearing housing; and Figure 5 is a radial section of the supersonic ram diffuser taken along line 5—5 of Figure 2.

The compressing of the air is accomplished by a centrifugal impeller which discharges air substantially axially with respect to the impeller and into a counter rotating rotor having passages near its perimeter. The relative air velocity at the inlet of said passage is supersonic and the passages first converge to reduce the velocity to sonic and then diverge to convert a large portion of the dynamic pressure to static pressure. Fuel is burned in the air while still in the rotor and the products of combustion are discharged with a peripheral component to exert a torque on the rotor. Additional turbine blading extracts more of the power.

The turbine-compressor unit as shown in Figure 1 is housed in an outer case 1 made up of three co-axial sections, 1a, 1b and 1c, housing the internal rotating and static elements and supporting the external annular turbine fuel preheater system.

The hub element 3, attached by streamlined vanes 5 to case 1a, rigidly supports the hollow-stationary shaft 7 by means of keys 9 and nut 11, which shaft in turn mounts ball-bearings 13 and 15 of centrifugal impeller 17, ball bearing 19 of the supersonic ram diffuser rotor 21, and planet gears 23 by means of mounting bolts 25, hardened steel sleeves 27, and oil slinger reservoir 29. Excess oil is scavenged from reservoir 29 by scavenger tube 31.

The oil reservoir 29 catches the oil thrown out centrifugally from the gears 23 and 41 to which oil is supplied by suitable holes drilled in the elements of the machine including shafts 7 and 25, a method well known in the art. The scavenging tube 31 would be led between the gears 23 to another hole drilled in stationary shaft 7.

Rotor 21, to which, by means of rivets 40, is attached the internal planetary gear 41 engaging stationary planet gears 23, drives in a counter direction the sun gear 42 attached to the centrifugal impeller 17 by screws 44, thus giving the air leaving the centrifugal impeller vanes 46 a supersonic entering velocity relative to the ram-diffuser vanes 48 mounted on rotor 21 and turning in the opposite direction. The vanes or blades 48 encompass the rotor hub 21a and are supported thereon at their root or inner ends. To sustain the static pressure rise in the rotor passages between the inlets and exits thereof and prevent a reverse or forward flow, the radial depth or extent of the inlets of the passages between blades 48 as shown is less than the maximum radius from the axis of rotation to the radially inward side of each such passage at the inlet end of each such passage.

The impeller 17 is comprised of a plurality of radial walls or vanes 46 disposed uniformly about the axis of rotation and forming ducts 45. A few of these are shown in Figure 2. The air flows in the ducts 45 axially and radially outward, discharging substantially axially. The ducts 45 are closed at their outer side by the bell-shaped shroud 47 which is fixed to the vanes 46, and a similar shroud 47a extends around the outer portions of the blades 48 and encloses the passages therebetween.

As shown in Fig. 2 the blades 48 of the rotor and hence the passages therebetween are set peripherally oblique to the axis of rotation of the rotor to give the blades a substantial pitch.

The ducts are designed to continuously accelerate the velocity therethrough so as to reduce losses in the boundary layer tending to form on the duct walls. There is a static pressure rise also in the duct of about the ratio of 1:4. The velocity of efflux of the jet from the duct would be of the order of 800 feet per second, and when combined vectorially with the peripheral velocity of the impeller exit would give an absolute leaving velocity of some 1400 feet per second. With the rotor 21 turning at high speed in the opposite direction to centrifugal impeller 17, the ram pressure into the rotor 21 readily raises the compression ratio to about 6 leaving that rotor. This value assures efficient thermal operation of the turbine. Because the air velocity relative to the inlet of the rotor is well above the velocity of sound the rotor passages are convergent to bring the air velocity to the velocity of sound at the throat of the passage and then divergent to convert the velocity to static pressure.

It will be noted in Figure 5, which shows an intermediate radial section between the supersonic ram-diffuser vanes 48 taken along line 5—5 of Figure 2, that a sinusoidal contraction occurs between stations A to B such that at design operating conditions the entering air flows from supersonic velocity at A to sonic velocity at B, at which station a transverse shock wave occurs bringing the velocity of the air leaving station B into the subsonic range and allowing a normal sub-sonic diffusion to take place from station B to station C (Figure 5) at which point the air is at a high pressure and low relative velocity, the required conditions for best efficiency heat addition.

The heat addition following station C is accomplished by the spontaneous burning of fuel which has been preheated beyond the flash point and which is introduced into the annular burner chamber 50 of Figures 1 and 2 by means of a multiplicity of high pressure nozzles 52, the stems 53 of which are insulated from the case sections 1b and 1c by insulation plugs 54. The nozzles 52 are pointing in the direction for achieving best efficiency vortex combustion of the fuel with the high pressure air leaving the diffuser vanes 48.

Referring to Figure 1, the preheating of the turbine fuel to a temperature beyond the flash point is accomplished by passing the incoming high pressure turbine fuel from fuel line 56 into the annular distribution tube 58 from which it is distributed evenly into the annular counter flow preheater 60, where, as the fuel is carried forward from annular tube 62 by a large number of radially finned tubes 64 to the annular distribution tube 66 feeding the turbine fuel-nozzle-stem tubes 53, heat is absorbed from the hot gases of combustion passing aft through the preheater 60 from the auxiliary burner 68. Figure 3 is a sectional view of a portion of the annular turbine fuel preheater 60 taken along line 3—3 of Figure 1.

Fuel for the auxiliary burner system is introduced by fuel line 70 to the annular distribution tube 72, thence by a multiplicity of feeder tubes 74 to burner 68, where, after passing through vaporization tubes 76, into the annular vapor reservoir 78, and out jets 80, the fuel vapor burns with the air entering holes 82, the hot gases of combustion passing aft through the preheater 60. Initial ignition of the auxiliary burner is achieved by use of the ignition spark plug 84.

Thus a heat addition to the high pressure air leaving vanes 48 has been accomplished by the spontaneous burning of fuel with this air in annular combustion chamber 50. These hot high pressure turbine gases in chamber 50 are then expanded, in conventional turbine reaction-stage practice, through blades 90 of rotor part 92, through stator blades 94, through blades 96 of rotor 98, through stator blades 100, through blades 102 of rotor 104, and finally through the stator straightener vanes 106 to the atmosphere.

The rotor 21 is comprised of the two parts 21a and 92 screwed together at the center and pinned together near the periphery by pins 95.

The combustion chamber 50 is formed by the moving wall of 92 and the stationary wall 1c which has the insulation 93 fixed to it.

Drive shaft 112, integral with rotor 21 and supported by ball bearings 19 and 114, delivers the torque energy output of the turbine.

It will be noted in Figure 1 that the radius of rotation of blades 90 is considerably smaller than that of the diffuser vanes 48 rotating at the same R. P. M. This is necessary in order to reduce the blade stresses in blade 90 which otherwise would have been prohibitive due to the high comparative operating temperature after fuel heat addition takes place.

The annular labyrinth fingers 120, Figure 1, which are machined directly into the case 1a, are incorporated for two reasons. First, to form a set of labyrinth seals to cut down on air blow-by from the compressor, and, second, to reduce the windage circulation losses by isolating the air into smaller circulation pockets as shown at 122. Similar fingers have been incorporated in the stampings making up oil slinger reservoir 29.

For aircraft use the turbine would incorporate a tail cone 124, Figure 1, upon which is mounted a streamlined ram scoop 126 for directing cooling air onto the housing 128 of ball bearing 110.

It is to be understood that the compressor described is very useful in the subsonic regime as well as in the supersonic. In fact to attain the supersonic regime the rotor must first proceed through the subsonic regime of flow. For many purposes both in gas turbines and as separate compressors, the subsonic may be selected as the principal regime of action.

The compressor rotor 21a expands the relative air flow so that the pressure rises toward the exits of the rotor passages. In the subsonic regime this process proceeds without the occurrence of a shock wave and is consequently very efficient.

Although I have illustrated a particular means of heating the fluid which flows into the chamber 50, it is to be understood that other means may be employed such, for instance, as heat from other prime movers, other chemicals or atomic disintegration and the like.

It will now be clear that I have disclosed a novel power plant of small dimensions, light weight and low cost. It will also be clear that I have disclosed a novel compressor means of high output for a small size, and particularly adapted to a gas turbine of small power.

I have now described suitable embodiments of my invention which are now preferred. It is to be understood however that the invention is not limited to the particular construction illustrated and described and that I intend to claim it broadly as indicated by the scope of the appended claims.

I claim:

1. In combination in a fluid machine adapted for the interchange of energy between a fluid and its rotating parts, a case, an impeller mounted in said case for rotation about an axis to compress a fluid flow, and an axial flow compressor rotor mounted downstream from said impeller for rotation about said axis, said rotor having a plurality of passages whose inlets and exits are located at substantially similar distances from said axis, each said passage being adapted to receive said fluid from said impeller, each said exit facing rearward to discharge fluid rearward in the general axial direction, each said exit having a greater area and radial depth than said corresponding inlet to increase the pressure of said fluid received from said impeller.

2. In combination in an axial flow compressor, a case having a main flow passage, an axial flow rotor mounted for rotation about an axis with a plurality of blades in said main passage, said blades being spaced peripherally about said rotor and dividing said main passage into a plurality of subpassages having inlets and exits spaced outward from said axis by substantially similar distances, the radial extent of each said inlet being less than the maximum radius from said axis to the radially inward side of each said subpassage at the inlet end of said subpassage, each said exit facing rearward to discharge fluid rearward in the general axial direction, and means for rotating said rotor to impel a flow of fluid through said subpassages, said main flow passage increasing in cross sectional area in the downstream direction between the upstream side and the downstream side of said rotor to provide for compressing said fluid by said rotor, said blades having greater radial extent at the exits than at the inlets thereof, the radial distances from said axis to the tips of the blades taken successively in the downstream direction substantially increasing in length, each said subpassage being set peripherally obliquely to said axis and being thereby adapted to receive a fluid flow thereinto directed parallel to the inlet portion of said subpassage while providing pumping action on said fluid.

3. In combination in an axial flow compressor, a case having a main passage therethrough in the general axial direction, a hub mounted in said case for rotation about an axis, a plurality of blades in said main passage mounted on said hub and spaced peripherally thereabout to divide said passage into a plurality of subpassages, and means to rotate said hub and blades about said axis to impel fluid axially through said main passage and said subpassages to an exit facing substantially rearward to discharge fluid rearward in the general axial direction, each said subpassage having a substantially straight axis, each said subpassage being set peripherally obliquely to said rotation axis and adapted to receive a fluid flow thereinto directed along said subpassage axis while providing pumping action on said fluid, said main passage having a greater cross sectional area at the exit of said subpassages than at the inlets thereof to provide each said subpassage with a larger exit than inlet area and adapting each subpassage to perform a pumping action on said fluid, each said blade having a greater radial width at said exit than at said inlet and the radial width of each said inlet being less than the maximum radius from said axis to the radially inward side of each said subpassage at the inlet end of said subpassage, the radial distances from said axis to the tips of the blades taken successively in downstream direction substantially increasing in length.

4. In combination in a compressor, a case, and an axial flow rotor mounted in said case for rotation about an axis to impel fluid through said case in the general axial direction, said rotor having walls defining a passage with inlet and exit spaced substantially similar distances from said axis, said exit having a greater radial width and a greater cross sectional area than has said inlet to provide pumping action, the radial extent of said inlet being less than the maximum radius from said axis to the radially inward side of said passage at the inlet end of said passage, the radial distances from said axis to the outer boundary surface of said passage taken successively in the downstream direction substantially increasing in length, and means to rotate said rotor to pump fluid flowing through said passage, said passage being set peripherally obliquely to said axis and thereby being adapted to receive a fluid flow thereinto directed parallel to the inlet portion of said passage while providing pumping action on said fluid.

5. In an axial flow compressor, a compressor rotor having a flow passage therethrough whose exit is greater than its inlet in radial depth, said exit facing rearward in the general axial direction with an exit area greater than the inlet area of said passage, the radial extent of said inlet being less than the maximum radius from the axis of rotation to the radially inward side of said passage at the inlet end of said passage, and walls defining a main flow passage leading away downstream from said exit of said rotor passage, the radial depth of the inlet portion of said main flow passage at said rotor exit being substantially greater than the radial depth of said inlet of said rotor passage and substantially conforming in radial extent to the radial extent of said rotor passage exit, the axial length of the diverging portion of said rotor passage being not greater than the maximum radial extent of said passage and the radial distances from said axis to the radially outer side of said walls bounding said passage taken successively in the downstream direction substantially increasing in length, said rotor passage being set peripherally obliquely to the axis of rotation of said rotor and thereby adapted to receive a fluid directed obliquely to said axis and parallel to the inlet portion of said rotor passage while providing pumping action on said fluid.

6. In combination in a compressor, an axial flow compressor rotor mounted for rotation about an axis, said rotor having a plurality of peripherally spaced blades defining therebetween fluid flow passages each having a greater cross sectional area and radial depth at its exit than at its inlet, said exit facing rearward to direct a fluid rearward in the general axial direction, the radial extent of each of said inlets being less than the maximum radius from said axis to the radially inward side of each said passage at the inlet end of each said passage, each said blade being disposed at a substantial angle to said axis, a structure positioned ahead of said rotor having flow directing vanes disposed substantially parallel to said axis to direct fluid toward said blades, said blades having said angle to receive a relative fluid flow directed parallel to the forward portions of said blades at highly magnified velocity against the direction of rotation as a result of the rotation of said rotor, to compress a fluid flowing through said passages by radial diffusion in said passages.

7. In combination in a compressor, an axial flow rotor having a plurality of passages therethrough spaced outward from its axis, means mounting said rotor for rotation about said axis, each said passage extending through said rotor from front to rear thereof to an exit facing rearward to direct a flow in the general axial direction, and means mounted ahead of said rotor to provide a relative fluid flow having a velocity component opposite to the direction of rotation of said rotor, said fluid flow approaching and passing through said passages, each said rotor passage being defined by a peripheral wall formed in said rotor and rotatable therewith, portions of said wall being disposed at increasing distances from said axis in the downstream direction to provide a diverging portion of increasing radial depth and cross sectional area to efficiently convert the dynamic pressure of the relative flow to static pressure.

8. In combination in a compressor, a case, and an axial flow rotor mounted in said case for rotation about an axis to impel fluid through said case in the general axial direction, said rotor having walls defining a passage with inlet and exit spaced from said axis, said exit having a greater radial width and a greater cross-sectional area than has said inlet to provide pumping action, the radial extent of said passage inlet being less than the maximum radius from said axis to the radially inward side of said passage at the inlet end of each said passage, the axial length of the diverging portion of said rotor passage being not substantially greater than the maximum radial extent of said passage and the radial distances from said axis to the outer boundary surface of said passage taken successively in the downstream direction substantially increasing in length, and means to rotate said rotor to pump fluid flowing through said passage, said passage being set peripherally obliquely to said axis and thereby being adapted to receive a fluid flow thereinto directed parallel to the inlet portion of said passage while providing pumping action on said fluid.

9. The combination as defined in claim 2 including a shroud around the outer portions of said blades.

10. The combination as defined in claim 8 in which there is an initial non-diverging portion of the rotor passage downstream from the inlet thereto.

11. In combination in an axial flow compressor, a case, and an axial flow rotor having a hub and mounted in said case for rotation about an axis to impel a flow of fluid therethrough, said rotor having a plurality of axial flow blades spaced peripherally about said hub and supported thereon, said blades defining a plurality of passages each having its inlet and exit spaced from said axis, each said passage extending in the general axial direction to said exit which faces rearward to discharge fluid rearward in the general axial direction, each said exit having a greater radial depth and a greater cross sectional area than has each said inlet to provide pumping action for said fluid, said rotor passages having an axial length which is substantially less than the maximum radius of said hub, the radial distances from said axis to the tips of said blades taken successively in the downstream direction substantially increasing in length, each said passage being set peripherally obliquely to said axis and thereby being adapted to receive a fluid flow thereinto directed parallel to the inlet portion of said passage while providing pumping action on said fluid.

EDWARD A. STALKER.

References Cited in the file of this patent

UNITED STATES PATENTS

| Number | Name | Date |
|---|---|---|
| 617,022 | Irgens | Jan. 3, 1899 |
| 910,760 | Wood | Jan. 26, 1909 |
| 1,097,729 | Rice | May 26, 1914 |
| 1,125,118 | Kerr | Jan. 18, 1915 |
| 1,331,766 | Heminway | Feb. 24, 1920 |
| 1,934,237 | Russell | Nov. 7, 1933 |
| 2,304,994 | Franck | Dec. 16, 1942 |
| 2,326,072 | Seippel | Aug. 3, 1943 |
| 2,360,130 | Heppner | Oct. 10, 1944 |
| 2,411,552 | New | Nov. 26, 1946 |
| 2,435,236 | Redding | Feb. 3, 1948 |

FOREIGN PATENTS

| Number | Country | Date |
|---|---|---|
| 564,826 | Germany | Nov. 23, 1932 |
| 685,830 | France | Apr. 7, 1930 |